United States Patent
Yokoi et al.

(10) Patent No.: US 7,484,359 B2
(45) Date of Patent: Feb. 3, 2009

(54) EXHAUST PURIFYING APPARATUS FOR INTERNAL COMBUSTION ENGINE

(75) Inventors: Tatsuhisa Yokoi, Toyota (JP); Yasuhiko Otsubo, Toyota (JP); Shigehiro Matsuno, Toyota (JP); Hiroki Matsuoka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 10/590,662

(22) PCT Filed: Mar. 10, 2005

(86) PCT No.: PCT/JP2005/004730

§ 371 (c)(1),
(2), (4) Date: Aug. 25, 2006

(87) PCT Pub. No.: WO2005/088087

PCT Pub. Date: Sep. 22, 2005

(65) Prior Publication Data

US 2007/0169468 A1 Jul. 26, 2007

(30) Foreign Application Priority Data

Mar. 11, 2004 (JP) ............................. 2004-068989

(51) Int. Cl.
*F01N 3/00* (2006.01)
(52) U.S. Cl. .............................. 60/286; 60/295; 60/297; 60/303
(58) Field of Classification Search ................... 60/274, 60/278, 280, 286, 295, 297, 303, 311
See application file for complete search history.

(56) References Cited

U.S. PATENT DOCUMENTS

| 6,672,989 B2 * | 1/2004 | Murata et al. ................. 477/97 |
| 6,763,799 B2 * | 7/2004 | Ito et al. ..................... 123/299 |
| 6,851,258 B2 * | 2/2005 | Kawashima et al. .......... 60/311 |

(Continued)

FOREIGN PATENT DOCUMENTS

DE 100 43 613 A1 2/2002

(Continued)

OTHER PUBLICATIONS

Japanese Office Action, Appln. No. JP 2004-068989 dated Jul. 31, 2007.

*Primary Examiner*—Binh Q. Tran
(74) *Attorney, Agent, or Firm*—Kenyon & Kenyon LLP (57) ABSTRACT

An exhaust purifying apparatus for an internal combustion engine having a DPNR converter (26), a fuel adding device (46), and an electronic control device (50) is provided. The DPNR converter (26) is located in an exhaust passage (14) of the internal combustion engine (10). The DPNR converter (26) traps particulate matter in exhaust gas. The fuel adding device (46) adds fuel to exhaust as that passes through the DPNR converter (26). The electronic control device (50) estimates a combustion rate of particulate matter in the DPNR converter (26) in a state where the fuel adding device (46) adds fuel to the exhaust gas. Based on the estimated combustion rate, the electronic control device (50) sets a manner of adding fuel by the fuel adding device (46). As a result, the exhaust purifying apparatus suppresses excessive temperature increase of a DPNR converter (26) to which fuel is added.

15 Claims, 4 Drawing Sheets

U.S. PATENT DOCUMENTS

| | | |
|---|---|---|
| 7,031,827 B2 * | 4/2006 | Trudell et al. .............. 701/114 |
| 7,246,485 B2 * | 7/2007 | Ohki et al. .................. 60/285 |
| 7,251,931 B2 * | 8/2007 | Nonoyama et al. .......... 60/297 |
| 2003/0230076 A1 | 12/2003 | Kwon |
| 2004/0013579 A1 | 1/2004 | Schaller |

FOREIGN PATENT DOCUMENTS

| | | |
|---|---|---|
| EP | 1 229 223 A1 | 8/2002 |
| JP | 2002-227688 A | 8/2002 |
| JP | 2002-332822 A | 11/2002 |
| JP | 2003-020930 A | 1/2003 |
| JP | 2003-184536 | 7/2003 |
| JP | 2003-286878 | 10/2003 |
| JP | 2003-328727 | 11/2003 |
| JP | 2004-036405 | 2/2004 |
| WO | WO 00/28196 A | 5/2000 |

\* cited by examiner

EXHAUST PURIFYING APPARATUS FOR INTERNAL COMBUSTION ENGINE

This is a 371 national phase application of PCT/JP2005/004730 filed 10 Mar. 2005, claiming priority to Japanese Patent Application No. 2004-068989 filed 11 Mar. 2004, the contents of which are incorporated herein by reference.

FIELD OF THE INVENTION

The present invention relates to an exhaust purifying apparatus for an internal combustion engine that adds fuel to an exhaust purifying member located in an exhaust passage.

BACKGROUND OF THE INVENTION

An exhaust purifying member that purifies exhaust gas by trapping particulate matter (PM) in exhaust gas with a filter located in an exhaust passage has been employed for an internal combustion engine such as a vehicle diesel engine. In such an exhaust purifying member, the filter needs to be regenerated by removing particulate matter accumulated in the filter before the filter is clogged by accumulation of trapped particulate matter.

Japanese Laid-Open Patent Publication No. 2003-20930 discloses an exhaust purifying apparatus that eliminates particulate matter in the filter. In the exhaust purifying apparatus of the above publication, the filter supports a catalyst that promotes oxidization of particulate matter, and fuel is added to exhaust gas that flows into the filter. The particulate matter trapped in the filter is oxidized (burned) by adding fuel, and the filter is thus regenerated.

If fuel is added as described above when clogging is caused at an upstream side of the exhaust purifying member, the following problems are likely to occur.

If clogging occurs, the flow of exhaust gas becomes uneven at a section where the clogging has occurred. Therefore, fuel that was supposed to be burned at this section is burned downstream of the section. In this case, particulate matter that is accumulated at the downstream section or particulate matter remaining unburned from a PM elimination process, that is, residual particulate matter is abruptly burned, which excessively increases the temperature of the exhaust purifying member. As a result, for example, thermal degradation may occur.

The state in which clogging is caused at the upstream side of the exhaust purifying member includes a state in which clogging is caused at the upstream end of the exhaust purifying member and a state in which clogging is caused in an exhaust purifying catalyst located upstream of the exhaust purifying member.

SUMMARY OF THE INVENTION

Accordingly, it is an objective of the present invention to provide an exhaust purifying apparatus for an internal combustion engine that suppresses excessive temperature increase of an exhaust purifying member to which fuel is added.

To achieve the foregoing and other objectives and in accordance with the purpose of the present invention, an exhaust purifying apparatus for an internal combustion engine having an exhaust purifying member, a fuel adding device, and a setting section is provided. The exhaust purifying member is located in an exhaust passage of the internal combustion engine. The exhaust purifying member traps particulate matter in exhaust gas. The fuel adding device adds fuel to exhaust gas that passes through the exhaust purifying member. The setting section estimates a combustion rate of particulate matter in the exhaust purifying member in a state where the fuel adding device adds fuel to the exhaust gas. Based on the estimated combustion rate, the setting section sets a manner of adding fuel by the fuel adding device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

An exhaust purifying apparatus for an internal combustion engine according to a first embodiment of the present invention will now be described with reference to FIGS. 1 to 3.

Figure 1:
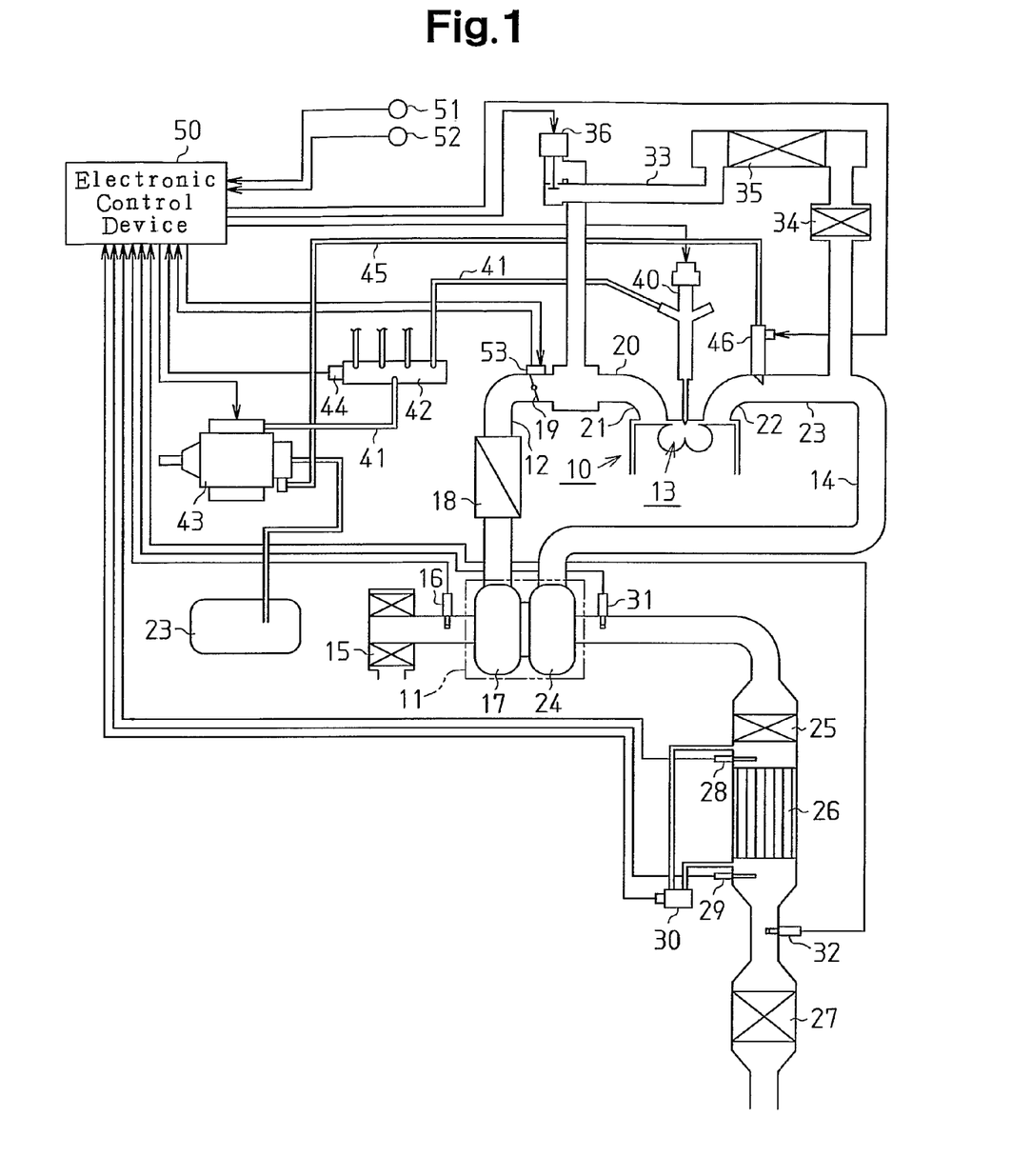
FIG. 1 is a diagram illustrating an internal combustion engine and its peripheral structure to which an exhaust purifying apparatus of an internal combustion engine according to a first embodiment of the present invention is applied.

FIG. 1 illustrates the configuration of an internal combustion engine 10 to which the exhaust purifying apparatus according to the first embodiment is applied. The internal combustion engine 10 is a diesel engine that includes a common rail fuel injection device and a turbocharger 11. The engine 10 includes an intake passage 12, combustion chambers 13, and an exhaust passage 14.

The intake passage 12 forms an intake system for the internal combustion engine 10. In the most upstream section of the intake passage 12, an air cleaner 15 is located. From the air cleaner 15 toward the downstream side, an air flow meter 16, a compressor 17 incorporated in the turbocharger 11, an intercooler 18, and an intake throttle valve 19 are provided in the intake passage 12. The intake passage 12 is branched at an intake manifold 20 located downstream of the intake throttle valve 19, and connected to each of the combustion chambers 13 of the internal combustion engine 10 through intake ports 21.

In the exhaust passage 14, which forms part of the exhaust system for the internal combustion engine 10, an exhaust port 22 is connected to each combustion chamber 13. The exhaust ports 22 are connected to an exhaust turbine 24 of the turbocharger 11 through an exhaust manifold 23. In a section of the exhaust passage 14 that is downstream of the exhaust turbine 24, a NOx catalytic converter 25, a DPNR converter 26, and an oxidation catalytic converter 27 are provided in this order from the upstream side.

The NOx catalytic converter 25 supports a storage reduction NOx catalyst. The NOx catalyst stores NOx in exhaust gas when the concentration of oxygen in exhaust gas is high, and emits the stored NOx when the concentration of oxygen in the exhaust gas is low. If a sufficient amount of unburned fuel component, which functions as a reducing agent, exists in the vicinity thereof, the NOx catalyst reduces emitted Nox to purify the exhaust gas. The NOx catalytic converter 25 constitutes the exhaust purifying catalyst through which particulate matter in exhaust gas passes.

The DPNR converter 26 is made of a porous material and traps particulate matter in exhaust gas. Like the NOx catalytic converter 25, the DPNR converter 26 supports a storage reduction NOx catalyst. The NOx catalyst of the DPNR converter 26 reduces emitted Nox to purify the exhaust gas. The reaction triggered by the NOx catalyst oxidizes and removes the trapped particulate matter. The DPNR converter 26 constitutes the exhaust purifying member.

The oxidation catalytic converter 27 supports an oxidation catalyst. The oxidation catalyst oxidizes HC and CO in exhaust gas and purifies exhaust gas.

In sections upstream of and downstream of the DPNR converter 26 of the exhaust passage 14, a first gas temperature sensor 28 and a second gas temperature sensor 29 are provided, respectively. The first gas temperature sensor 28 detects an input gas temperature thci, which is the temperature of exhaust gas that flows into the DPNR converter 26. The second gas temperature sensor 29 detects an output gas temperature thco, which is the temperature of exhaust gas that has passed through the DPNR converter 26. Also, a differential pressure sensor 30 is provided in the exhaust passage 14. The differential pressure sensor 30 detects a pressure difference $\Delta P$ between a section upstream and a section downstream of the DPNR converter 26. Oxygen sensors 31, 32 are located in a section of the exhaust passage 14 that is upstream of the NOx catalytic converter 25 and a section of the exhaust passage 14 between the DPNR converter 26 and the oxidation catalytic converter 27, respectively. The oxygen sensors 31, 32 detect the concentration of oxygen in exhaust gas.

The internal combustion engine 10 further includes an exhaust gas recirculation device (EGR device) for returning some of the exhaust gas to the air in the intake passage 12. The EGR device includes an EGR passage 33 that connects the exhaust passage 14 with the intake passage 12. The most upstream section of the EGR passage 33 is connected to a section of the exhaust passage 14 that is upstream of the exhaust turbine 24. In the EGR passage 33, an EGR catalyst 34, an EGR cooler 35, and an EGR valve 36 are provided in this order from the upstream side. The EGR catalyst 34 reforms recirculated exhaust gas. The EGR cooler 35 cools the reformed exhaust gas. The EGR valve 36 adjusts the flow rate of the reformed and cooled exhaust gas. The most downstream section of the EGR passage 33 is connected to a section of the intake passage 12 that is downstream of the intake throttle valve 19.

An injector 40 is provided in each combustion chamber 13 of the internal combustion engine 10 to inject fuel to be combusted in the combustion chamber 13. The injectors 40 are connected to a common rail 42 with a high-pressure fuel pipe 41. High-pressure fuel is supplied to the common rail 42 through a fuel pump 43. The pressure of high-pressure fuel in the common rail 42 is detected by a rail pressure sensor 44 attached to the common rail 42.

The fuel pump 43 is capable of supplying low-pressure fuel to a fuel adding valve 46 through a low-pressure fuel pipe 45. The fuel adding valve 46 is provided in the exhaust port 22 of a specific cylinder and injects fuel to the exhaust turbine 24. In this manner, the fuel adding valve 46 adds fuel to exhaust gas.

An electronic control device 50 that is in charge of various controls of the internal combustion engine 10 includes a CPU that executes various computation processes related to control of the engine 10, a ROM storing programs and data necessary for the control, a RAM for temporarily storing the computation results of the CPU, and input and output ports for inputting and outputting signals from and to the outside. In addition to the above described sensors, the input port of the electronic control device 50 is connected to an engine rotational speed sensor 51 for detecting the rotational speed NE of the engine 10, an acceleration pedal sensor 52 for detecting the degree of depression of an acceleration pedal, and a throttle valve sensor 53 for detecting the opening degree of the intake throttle valve 19. The output port of the electronic control device 50 is connected to a drive circuit for driving the intake throttle valve 19, the injectors 40, the fuel pump 43, the fuel adding valve 46, and the EGR valve 36.

Based on detected signals from the above described sensors, the electronic control device 50 grasps the operating condition of the engine 10. According to the grasped operating condition, the electronic control device 50 outputs command signals to the drive circuits of the devices connected to the output port. The electronic control device 50 executes various control procedures such as control of the timing and the amount of fuel injection from the injector 40, control of the opening degree of the intake throttle valve 19, and EGR control based on the opening degree control of the EGR valve 36.

The electronic control device 50 adds fuel to exhaust gas from the fuel adding valve 46 as part of the controls. The fuel adding valve 46 adds fuel to exhaust gas during the following controls, that is, a PM elimination control, a NOx reduction control, and an S release control.

The PM elimination control is executed for burning particulate matter trapped by the DPNR converter 26 and discharging the particulate matter as carbon dioxide ($CO_2$) and water ($H_2O$). This eliminates the clogging of the DPNR converter 26. In the PM elimination control, the fuel adding valve 46 continuously adds fuel to exhaust gas, thereby oxidizing the added fuel in the exhaust gas and on the catalyst. The heat generated by the oxidization is used to increase the catalyst bed temperature (for example, to 600° C. to 700° C.). Accordingly, the particulate matter is burned.

The NOx reduction control is executed for reducing the NOx stored by the NOx catalytic converter 25 and the NOx catalyst of the DPNR converter 26 to nitrogen ($N_2$), carbon dioxide ($CO_2$), and water ($H_2O$) and releasing them. During the NOx reduction control, the fuel adding valve 46 intermittently adds fuel to exhaust gas at a certain interval so that the exhaust gas about the NOx catalyst is temporarily low in oxygen concentration and contains a large amount of unburned fuel component. In other words, rich spike is intermittently executed. This promotes release of NOx from the NOx catalyst and reduction of NOx. That is, NOx is reduced and purified.

The S release control is executed for restoring the NOx storage performance that is degraded when the sulfur oxide (SOx) is stored by the NOx catalyst. When the S release control is started, the fuel adding valve 46 continuously adds fuel to exhaust gas as in the PM elimination control, thereby increasing the catalyst bed temperature (for example, to a temperature in a range from 600° C. to 700° C.). Thereafter, as in the NOx reduction control, the fuel adding valve 46 intermittently adds fuel to exhaust gas for performing rich spike. This promotes release of SOx from the NOx catalysts and reduction of the SOx. Accordingly, the NOx storage performance is restored.

In the internal combustion engine 10, the injector 40 may execute after injection during the PM elimination control or while the catalyst bed temperature is being increased during the S release control. The after injection is injection performed after main injection in which fuel is injected to the combustion chamber 13 so that fuel is combusted in the combustion chamber 13. Most of fuel injected by the after injection is not burned in the combustion chamber 13 but is discharged to the exhaust passage. The after injection promotes the catalyst bed temperature to increase by increasing the amount of unburned fuel components in exhaust gas. The fuel adding valve 46, the after injection, and the like constitute adding device.

As described above, the first embodiment maintains the exhaust purification performance of the internal combustion engine 10 by adding fuel to exhaust gas from the fuel adding valve 46, which is located in the exhaust passage, or by executing the after injection from the injector 40 depending on the circumstances.

If fuel is added as described above when clogging is caused at the upstream end of the NOx catalytic converter 25, the following problems are likely to occur.

That is, when clogging occurs, the flow of exhaust gas in the NOx catalytic converter 25 becomes uneven. Therefore, fuel that is supposed to be burned in the NOx catalytic converter 25 is burned in the DPNR converter 26, which is located downstream of the NOx catalytic converter 25. Furthermore, particulate matter that is accumulated in the DPNR converter 26 or particulate matter remaining unburned from the PM elimination process, that is, the residual particulate matter is abruptly burned, thereby excessively increasing the temperature of the DPNR converter 26. As a result, for example, thermal degradation may occur. The phenomenon is likely to occur when the upstream section of the NOx catalytic converter 25 is degraded by heat.

In the first embodiment, a burn-up control is added as the control for adding fuel to exhaust gas by the fuel adding valve 46. The first embodiment suppresses the temperature of the DPNR converter 26 from excessively increasing by appropriately setting requirements for executing the burn-up control.

In the burn-up control, fuel is intermittently added to exhaust gas from the fuel adding valve 46. Accordingly, the following advantage is obtained.

When fuel keeps being added to the NOx catalytic converter 25 and the DPNR converter 26, the fuel continues to be burned at the upstream section of each converter 25, 26. Thus, exhaust gas having high temperature is continuously sent to the downstream section of each converter 25, 26. Therefore, the temperature of the NOx catalytic converter 25 and the DPNR converter 26 increases toward the downstream section. Thus, particulate matter tends to remain at the upstream section of the DPNR converter 26. When fuel is continuously added, the temperature of the NOx catalytic converter 25, which is located upstream of the DPNR converter 26, tends to stay low. Therefore, particulate matter easily collects on the front end portion of the NOx catalytic converter 25. As a result, clogging may occur.

On the other hand, when intermittently adding fuel to exhaust gas, high temperature gas is prevented from being continuously sent to the downstream section of the NOx catalytic converter 25 and the DPNR converter 26. This suppresses the temperature distribution of each converter 25 or 26 from being uneven. As a result, the amount of particulate matter that remains partially in the DPNR converter 26 is reduced and the amount of particulate matter collected at the front end portion of the NOx catalytic converter 25 is also reduced.

Although the intermittent fuel addition reduces the amount of particulate matter that remains partially in the DPNR converter 26 and the amount of particulate matter collected at the front end portion of the NOx catalytic converter 25, oxidation of the particulate matter is promoted as compared to the case where fuel is continuously added. Therefore, the combustion rate of particulate matter is increased, which may excessively increase the temperature of the DPNR converter 26. Thus, fuel is preferably added intermittently when the residual amount of particulate matter is small. Accordingly, in the first embodiment, the combustion rate of particulate matter is estimated when adding fuel. The manner of adding fuel is then determined based on the estimated combustion rate. More specifically, either the continuous fuel addition of the PM elimination control or the intermittent fuel addition of the burn-up control is set as the manner of adding fuel.

The fuel addition setting routine will now be described with reference to FIGS. 2 and 3.

Figure 2:
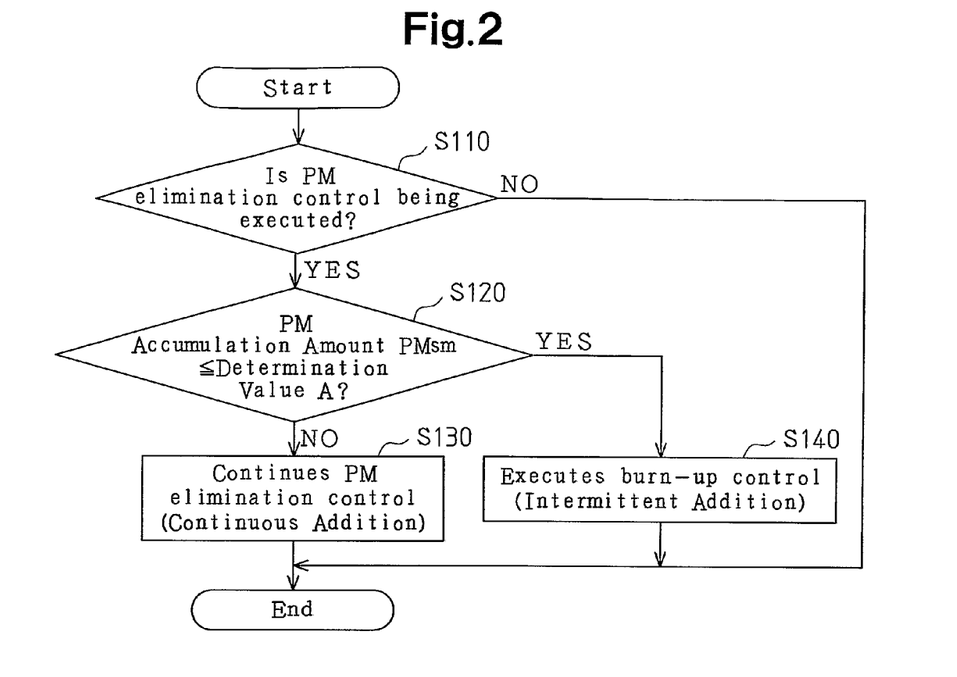
FIG. 2 is a flowchart showing a procedure for a fuel addition setting routine according to the first embodiment.

A series of processes shown in FIG. 2 represents a procedure for the fuel addition setting routine and is repeatedly executed by the electronic control device 50. The fuel addition setting procedure constitutes setting section.

When the routine is started, the electronic control device 50 determines whether the PM elimination control is being executed at step S110. The PM elimination control is executed when a PM accumulation amount PMsm in the DPNR converter 26 estimated by a separate process reaches a PM elimination reference value PMstart. The estimated PM accumulation amount PMsm is computed using the following formula (1).

$$PMsm \leftarrow Max[PMsm+PMe-PMc, 0] \quad (1)$$

PMsm: PM accumulation amount
PMe: PM emission amount
PMc: oxidation amount of PM The PM emission amount PMe is the amount of particulate matter emitted from the combustion chambers of the internal combustion engine 10. The PM emission amount PMe is computed in accordance with a map obtained through experiments in advance, that is, a PM emission amount computation map, which includes the engine rotational speed NE and the engine load (the fuel injection amount from the injector 40) as parameters.

The oxidation amount PMc is the amount of particulate matter trapped by the DPNR converter 26 that is purified by oxidization. The oxidation amount PMc is computed in accordance with a map obtained through experiments in advance, that is, an oxidation amount computation map, which includes the bed temperature of the DPNR converter 26 (in this embodiment, the output gas temperature thco detected by the second gas temperature sensor 29) and the intake air amount Ga detected by the air flow meter 16 as parameters.

The PM accumulation amount PMsm on the right side of the formula (1) is a value of the PM accumulation amount PMsm that has been computed in the previous execution. Max on the right side is an operator for extracting the greatest value from the values in the parentheses. Therefore, if "PMsm+PMe−PMc" has a positive value, it is used as the current PM accumulation amount PMsm. If "PMsm+PMe−PMc" has a negative value, 0 is used as the PM accumulation amount PMsm. If the PM emission amount PMe continues to be greater than the oxidation amount PMc (PM emission amount PMe>Oxidation amount PMc) due to the operating condition of the internal combustion engine 10, the estimated PM accumulation amount PMsm gradually increases. On the other hand, when fuel is added, the PM emission amount PMe becomes less than the oxidation amount PMc (PM emission amount PMe<Oxidation amount PMc), and the estimated PM accumulation amount PMsm gradually decreases.

At step S110, if it is determined that the PM elimination control is not being executed, that is, if the decision outcome of step S110 is negative, the electronic control device 50 temporarily suspends the routine.

On the other hand, if it is determined that the PM elimination control is being executed, that is, if the decision outcome of step S110 is positive, the electronic control device 50 proceeds to step S120. At step S120, the electronic control device 50 determines whether the current PM accumulation amount PMsm is less than or equal to a determination value A.

As the accumulation amount of particulate matter in the DPNR converter 26 increases, the combustion rate of the particulate matter increases. That is, the particulate matter is abruptly burned, and the temperature of the DPNR converter 26 is likely to increase excessively. Therefore, the combustion rate of particulate matter is be estimated based on the PM accumulation amount PMsm. The determination value A is set as a value for determining whether the current PM accumulation amount PMsm is small enough so that even if the intermittent fuel addition of the burn-up control is executed, particulate matter in the DPNR converter 26 is not abruptly burned and the thermal degradation of the DPNR converter 26 does not occur. The determination value A is a value smaller than the PM elimination reference value PMstart and is optimized through experiments performed in advance.

If it is determined that the current PM accumulation amount PMsm is greater than the determination value A, that is, if the decision outcome of step S120 is negative, the electronic control device 50 determines that a large amount of particulate matter still remains in the DPNR converter 26 and there is a possibility that the particulate matter will be abruptly burned in the DPNR converter 26 if fuel is intermittently added. Thus, the electronic control device 50 proceeds to step S130 and keeps executing the continuous fuel addition of the PM elimination control. Then, the electronic control device 50 temporarily suspends the routine.

On the other hand, if the amount of particulate matter in the DPNR converter 26 is decreased by continuing the PM elimination control and it is determined that the current PM accumulation amount PMsm is less than or equal to the determination value A, that is, if the decision outcome of step S120 is positive, the electronic control device 50 assumes that the intermittent fuel addition will not cause abrupt burning of particulate matter in the DPNR converter 26. Therefore, the electronic control device 50 proceeds to step S140 and executes the intermittent fuel addition of the burn-up control. The electronic control device 50 then temporarily suspends the current process.

When the above requirements are satisfied and the intermittent fuel addition of the burn-up control is executed, the residual amount of particulate matter in the DPNR converter 26 is decreased by a certain amount. Therefore, fuel is added in the intermittent fuel addition only a predetermined number of times (three times in the first embodiment). This suppresses deterioration of fuel consumption caused by adding fuel. The number of times fuel is added may be changed as required.

Figure 3:
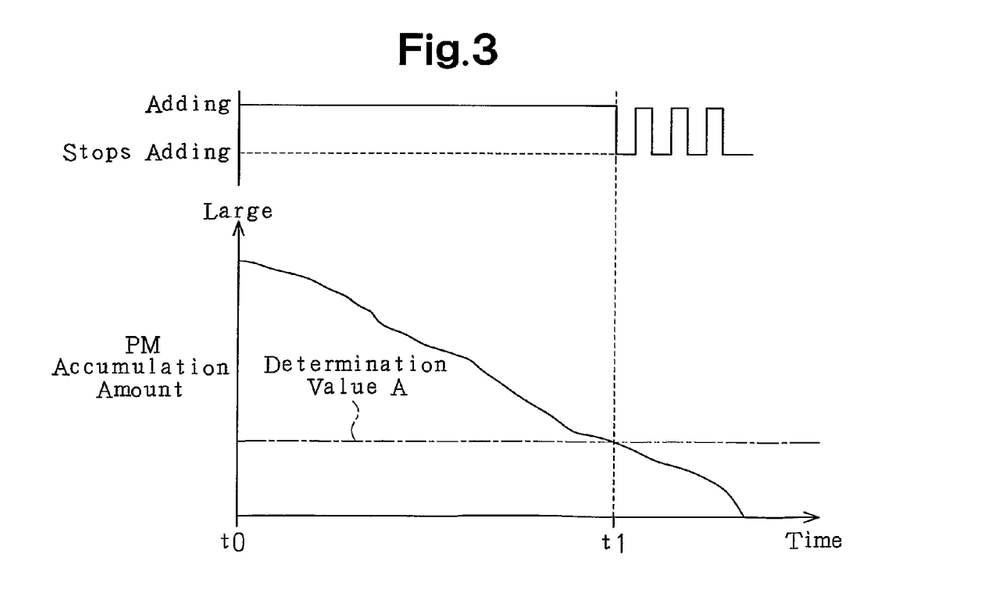
FIG. 3 is a time chart showing the manner of adding fuel according to the first embodiment.

FIG. 3 shows the variation of the PM accumulation amount PMsm and the manner of adding fuel when the fuel addition setting routine is executed. In FIG. 3, the PM accumulation amount PMsm has reached the PM elimination reference value PMstart at time t0, and the PM elimination control is already being executed.

As shown in FIG. 3, the amount of particulate matter in the DPNR converter 26 decreases by the continuous fuel addition of the PM elimination control, and the PM accumulation amount PMsm gradually decreases. During the period in which the PM accumulation amount PMsm is greater than the determination value A, which is from time t0 to time t1, the continuous fuel addition is set as the manner of adding fuel. When the PM accumulation amount PMsm becomes less than or equal to the determination value A at time t1, the intermittent fuel addition is set as the manner of adding fuel. After fuel is added three times in the intermittent fuel addition, the fuel addition is terminated. After time t1, the amount of particulate matter collected on the front end portion of the NOx catalytic converter 25 is decreased by executing the intermittent fuel addition. This promotes oxidization of the residual particulate matter in the DPNR converter 26.

If the intermittent fuel addition is continued for a longer period, the residual particulate matter particularly at the upstream section of the DPNR converter 26, that is, the particulate matter that might not be burned sufficiently by the continuous fuel addition is sufficiently burned.

The present embodiment has the following advantages.

(1) The combustion rate of particulate matter in the DPNR converter 26 is estimated when fuel is added. More specifically, the combustion rate of particulate matter is estimated based on the estimated accumulation amount (PMsm) of particulate matter in the DPNR converter 26. Based on the estimated combustion rate, the manner of adding fuel is determined. Therefore, the manner of adding fuel is set in accordance with the estimated combustion rate of particulate matter. This reliably suppresses the temperature of the DPNR converter 26 to which fuel is added from being excessively increased.

(2) If it is assumed that the combustion rate of particulate matter is less than the predetermined rate, or more specifically, if the PM accumulation amount PMsm is less than or equal to the determination value A, the manner of adding fuel is set to the intermittent fuel addition. Therefore, the temperature of the DPNR converter 26 is prevented from being excessively increased while reducing the amount of particulate matter collected at the front end portion of the NOx catalytic converter 25, and suppressing particulate matter from partially remaining in the DPNR converter 26.

(3) The intermittent fuel addition is performed only the predetermined number of times. Therefore, deterioration of the fuel consumption caused by adding fuel is suppressed in a suitable manner.

(4) If it is assumed that the combustion rate of particulate matter exceeds the predetermined rate, or more specifically, if the PM accumulation amount PMsm is greater than the determination value A, the manner of adding fuel is set to the continuous fuel addition. Therefore, while suppressing abrupt oxidization of particulate matter accumulated in the DPNR converter 26, the amount of particulate matter is decreased in a suitable manner.

Second Embodiment

An exhaust purifying apparatus for an internal combustion engine according to a second embodiment of the present invention will now be described with reference to FIG. 4.

In the first embodiment, the combustion rate of particulate matter is estimated based on the PM accumulation amount PMsm. As the accumulation amount of particulate matter in the DPNR converter 26 increases, the emission resistance in the DPNR converter 26 increases. Therefore, the difference between the pressure at the upstream end of the DPNR converter 26 and the pressure at the downstream end of the DPNR converter 26 is increased. Thus, the accumulation amount of particulate matter, in other words, the combustion rate of particulate matter is estimated based on the pressure difference. The combustion rate of particulate matter is therefore estimated based on the pressure difference ΔP between the sections upstream and downstream of the DPNR converter 26 in the second embodiment.

Figure 4:
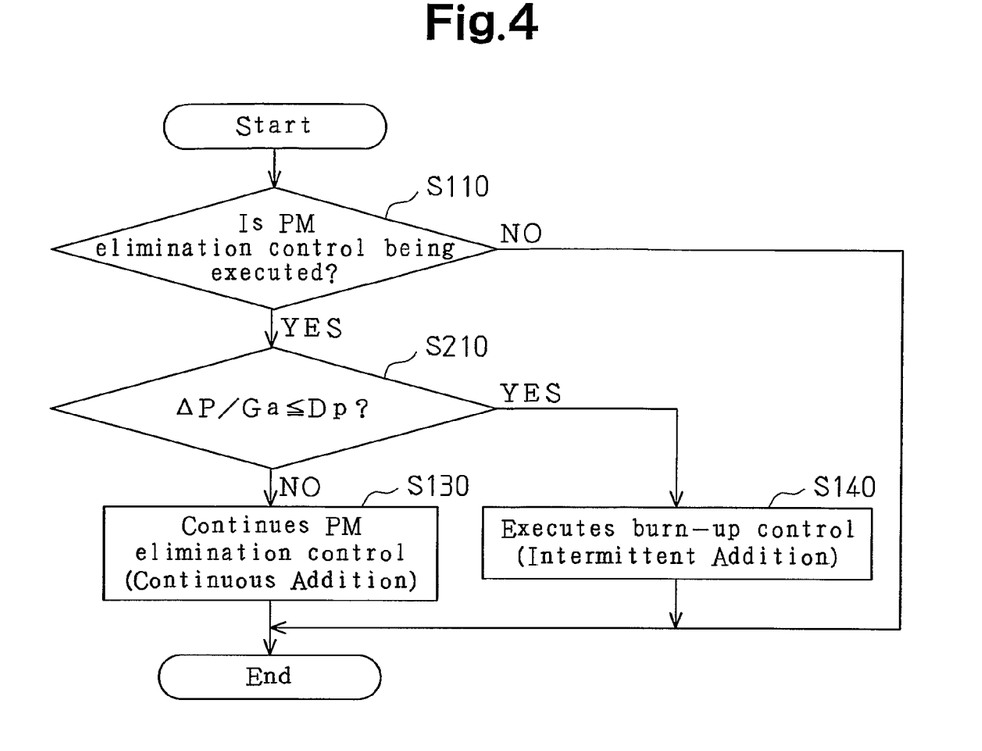
FIG. 4 is a flowchart showing a procedure for a fuel addition setting routine according to a second embodiment.

That is, in the procedure for the fuel addition setting routine of the second embodiment shown in FIG. 4, the electronic control device 50 determines whether the ratio of the pressure difference ΔP to the intake air amount Ga (ΔP/Ga) is less than or equal to a pressure difference determination value Dp at step S210 instead of the process of step S120 in FIG. 2, that is, determining whether the PM accumulation amount PMsm is less than or equal to the determination value A. Other steps are the same as those of the first embodiment. In FIG. 4, the same reference numerals are given to the processes that are the same as those in FIG. 2.

When estimating the PM accumulation amount in the DPNR converter 26, the estimation accuracy is improved by using the ratio of the pressure difference ΔP to the flow rate of exhaust gas (ΔP/flow rate of exhaust gas). Since the intake air amount Ga is directly proportional to the flow rate of exhaust gas, using the ratio of the pressure difference ΔP to the intake air amount Ga (ΔP/Ga) will not decrease the accuracy. Instead of comparing the value ΔP/GA with the determination value Dp, the pressure difference ΔP may be used as the pressure difference of exhaust gas and compared with a value that is increased as the exhaust flow rate (or the intake air amount GA) is increased. For example, the pressure difference ΔP may be compared with a value Dp×GA. Furthermore, the pressure difference ΔP may simply be compared with a predetermined determination value.

In the determination process of step S210 in FIG. 4, if it is determined that the value ΔP/GA is greater than the pressure difference determination value Dp, the electronic control device 50 determines that a large amount of particulate matter still remains in the DPNR converter 26, and there is a possibility that abrupt combustion occurs in the DPNR converter 26 if the intermittent fuel addition is performed. Therefore, the electronic control device 50 proceeds to step S130 and keeps executing the continuous fuel addition of the PM elimination control. The electronic control device 50 then temporarily suspends the current process.

On the other hand, if the amount of particulate matter in the DPNR converter 26 is decreased by continuing the PM elimination control and it is determined that the value ΔP/GA is less than or equal to the pressure difference determination value Dp, that is, if the decision outcome of step S210 is positive, the electronic control device 50 assumes that the intermittent fuel addition will not cause abrupt combustion of particulate matter in the DPNR converter 26. Therefore, the electronic control device 50 proceeds to step S140 and executes the intermittent fuel addition of the burn-up control. The electronic control device 50 then temporarily suspends the current process.

This configuration also provides the same advantages as that of the first embodiment.

Third Embodiment

An exhaust purifying apparatus for an internal combustion engine according to a third embodiment of the present invention will now be described with reference to FIG. 5.

Figure 5:
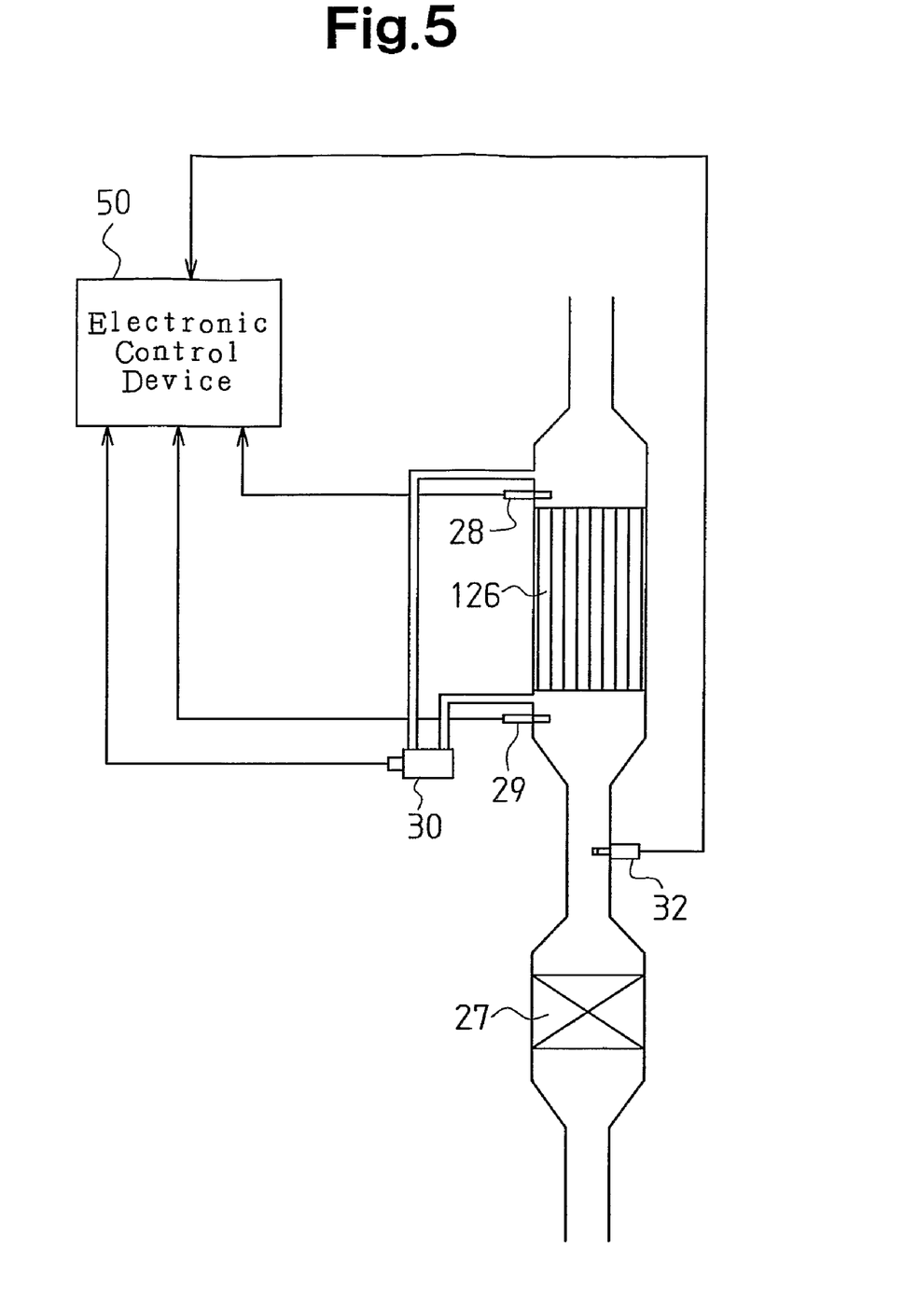
FIG. 5 is a diagrammatic view illustrating the structure of an exhaust purifying apparatus according to a third embodiment.

The third embodiment differs from the first embodiment in that the exhaust purifying apparatus is equipped with a DPNR converter 126 as shown in FIG. 5 instead of two converters such as the NOx catalytic converter 25 and the DPNR converter 26 of the first embodiment. Like the first embodiment, an input gas temperature thci, which is the temperature of exhaust gas that flows into the DPNR converter 126, is detected by the first gas temperature sensor 28. An output gas temperature thco, which is the temperature of exhaust gas that has passed through the DPNR converter 126, is detected by the second gas temperature sensor 29. The differential pressure sensor 30 detects the pressure difference ΔP between a section upstream and a section downstream of the DPNR converter 126.

With this structure, when fuel is kept being added to the DPNR converter 126, the fuel continues to be burned at the upstream section of the DPNR converter 126. Thus, exhaust gas having high temperature is continuously sent to the downstream section of the DPNR converter 126. Therefore, the temperature of the DPNR converter 126 is likely to increase toward the downstream section. Thus, particulate matter tends to remain at the upstream section of the DPNR converter 126. When fuel is continuously added, the temperature of the upstream section of the DPNR converter 126 tends to stay low. Therefore, particulate matter easily collects on the front end portion of the DPNR converter 126. As a result, clogging may occur.

On the other hand, when intermittently adding fuel to exhaust gas, exhaust gas having high temperature is prevented from being continuously sent to the downstream section of the DPNR converter 126. This suppresses the temperature distribution of the DPNR converter 126 from being uneven. Therefore, the amount of particulate matter partially remaining in the DPNR converter 126 is decreased and the amount of particulate matter collected at the front end portion of the DPNR converter 126 is also decreased in a suitable manner. Although the intermittent fuel addition suppresses particulate matter from partially remaining in the DPNR converter 126 and reduces the amount of particulate matter collected at the front end portion of the DPNR converter 126, oxidization of particulate matter is promoted as compared to a case where the continuous fuel addition is performed. Therefore, the combustion rate is increased and the temperature of the DPNR converter 126 may be excessively increased. That is, the same problem as that of the first embodiment may occur in the third embodiment.

Therefore, the fuel addition setting routine described in the first embodiment is also executed in the third embodiment. The third embodiment thus has the same advantages as the first embodiment, that is, the following advantages.

(1) The combustion rate of particulate matter in the DPNR converter 126 is estimated when fuel is added. More specifically, the combustion rate of particulate matter is estimated based on the estimated accumulation amount (PMsm) of particulate matter in the DPNR converter 126. Based on the estimated combustion rate, the manner of adding fuel is determined. Therefore, the manner of adding fuel is set in accordance with the estimated combustion rate of particulate matter. This reliably suppresses the temperature of the DPNR converter 126 to which fuel is added from being excessively increased.

(2) If it is assumed that the combustion rate of particulate matter is less than the predetermined rate, or more specifically, if the PM accumulation amount PMsm is less than or equal to the determination value A, the manner of adding fuel is set to the intermittent fuel addition. Therefore, the temperature of the DPNR converter 126 is prevented from being excessively increased while reducing the amount of particulate matter collected at the front end portion of the DPNR converter 126 and suppressing particulate matter from partially remaining in the DPNR converter 126.

(3) The intermittent fuel addition is performed the predetermined number of times. Therefore, deterioration of the fuel consumption caused by adding fuel is suppressed in a suitable manner.

(4) If it is assumed that the combustion rate of particulate matter exceeds the predetermined rate, or more specifically, if the PM accumulation amount PMsm is greater than the determination value A, the manner of adding fuel is set to the continuous fuel addition. Therefore, while suppressing abrupt oxidization of particulate matter accumulated in the DPNR converter 126, the amount of particulate matter is decreased in a suitable manner.

The above embodiments may be modified as follows.

In each of the above embodiments, the combustion rate of particulate matter may be estimated using the PM accumulation amount PMsm and the pressure difference $\Delta P$.

In each of the above embodiments, the PM accumulation amount PMsm and the pressure difference $\Delta P$ are used to estimate the combustion rate of particulate matter. On the other hand, since the difference between the input gas temperature thci and the output gas temperature thco tends to increase as the PM accumulation amount is increased, the combustion rate of particulate matter may be estimated using the temperature difference. As the above example, other values may be used as long as the combustion rate of particulate matter is estimated.

In the third embodiment, the fuel addition setting routine as described in the second embodiment may be performed. This configuration also provides the same advantages as the second embodiment.

Instead of detecting the intake air amount Ga by the air flow meter 16, the flow rate of exhaust gas may be computed based on the operating condition of the internal combustion engine 10 such as the engine rotational speed NE and the fuel injection amount. The computed flow rate of exhaust gas may be used instead of the intake air amount Ga.

The NOx catalytic converter 25 may be other catalytic converter, or the DPNR converter 26, 126 may be a filter, which has only a function of trapping particulate matter. In these cases, the present invention may be applied in the same manner.

Therefore, the present examples and embodiments are to be considered as illustrative and not restrictive and the invention is not to be limited to the details given herein, but may be modified within the scope and equivalence of the appended claims.

The invention claimed is:

1. An exhaust purifying apparatus for internal combustion engine, comprising:
   an exhaust purifying member that is located in an exhaust passage of the internal combustion engine, wherein the exhaust purifying member traps particulate matter in exhaust gas;
   a fuel adding device for adding fuel to exhaust gas that passes through the exhaust purifying member;
   a setting section, wherein the setting section estimates a combustion rate of particulate matter in the exhaust purifying member in a state where the fuel adding device adds fuel to the exhaust gas, and wherein, based on the estimated combustion rate, the setting section sets a manner of adding fuel by the fuel adding device;
   wherein the setting section switches the manner of adding fuel between a continuous fuel addition, in which fuel is continuously added to exhaust gas, and an intermittent fuel addition, in which fuel is intermittently added to exhaust gas; and
   wherein, when it is assumed that the combustion rate of particulate matter is less than a predetermined rate, the setting section sets the manner of adding fuel to the intermittent fuel addition.

2. An exhaust purifying apparatus for an internal combustion engine according to claim 1, further comprising:
   an exhaust purifying catalyst that is located in an exhaust passage of the internal combustion engine, wherein exhaust gas passes through the exhaust purifying catalyst.

3. The apparatus according to claim 1, wherein, during the intermittent fuel addition, the setting section adds fuel to exhaust gas only a predetermined number of times.

4. The exhaust purifying apparatus according to claim 1, wherein the setting section estimates the combustion rate of particulate matter based on an estimated accumulation amount of particulate matter in the exhaust purifying member.

5. The exhaust purifying apparatus according to claim 4, wherein the combustion rate of particulate matter estimated by the setting section is increased as the estimated accumulation amount becomes greater.

6. The exhaust purifying apparatus according to claim 1, wherein the setting section estimates the combustion rate of particulate matter based on a pressure difference between a section upstream and a section downstream of the exhaust purifying member.

7. The exhaust purifying apparatus according to claim 6, wherein the combustion rate of particulate matter estimated by the setting section is increased as the pressure difference becomes greater.

8. The exhaust purifying apparatus according to claim 1, wherein the setting section estimates the combustion rate of particulate matter based on an estimated accumulation amount of particulate matter in the exhaust purifying member, and a pressure difference between a section upstream and a section downstream of the exhaust purifying member.

9. The exhaust purifying apparatus according to claim 1, wherein the setting section estimates the combustion rate of particulate matter based on a ratio of a pressure difference between a section upstream and a section downstream of the exhaust purifying member to an intake air amount of the internal combustion engine.

10. The exhaust purifying apparatus according to claim 1, wherein the setting section estimates the combustion rate of particulate matter based on a difference between a temperature of exhaust gas that flows into the exhaust purifying member and a temperature of exhaust gas that has passed through the exhaust purifying member.

11. The exhaust purifying apparatus according to claim 2, wherein the setting section switches the manner of adding fuel between a continuous fuel addition, in which fuel is continuously added to exhaust gas, and an intermittent fuel addition, in which fuel is intermittently added to exhaust gas; and wherein, when it is assumed that the combustion rate of particulate matter is less than a predetermined rate, the setting section sets the manner of adding fuel to the intermittent fuel addition.

12. The exhaust purifying apparatus according to claim 2, wherein the setting section switches the manner of adding fuel between a continuous fuel addition, in which fuel is continuously added to exhaust gas, and an intermittent fuel addition, in which fuel is intermittently added to exhaust gas; and wherein, when it is assumed that the combustion rate of particulate matter exceeds a predetermined rate, the setting section sets the manner of adding fuel to the continuous fuel addition.

13. The exhaust purifying apparatus according to claim 2, wherein the setting section switches the manner of adding fuel between a continuous fuel addition, in which fuel is continuously added to exhaust gas, and an intermittent fuel addition, in which fuel is intermittently added to exhaust gas; and wherein, when it is assumed that the combustion rate of particulate matter is less than a predetermined rate, the setting section sets the manner of adding fuel to the intermittent fuel addition, and wherein, when it is assumed that the combustion rate of particulate matter exceeds the predetermined rate, the setting section sets the manner of adding fuel to the continuous fuel addition.

14. An exhaust purifying apparatus for an internal combustion engine, comprising:

an exhaust purifying member that is located in an exhaust passage of the internal combustion engine, wherein the exhaust purifying member traps particulate matter in exhaust gas;

a fuel adding device for adding fuel to exhaust gas that passes through the exhaust purifying member;

a setting section, wherein the setting section estimates a combustion rate of particulate matter in the exhaust purifying member in a state where the fuel adding device adds fuel to the exhaust gas, and wherein, based on the estimated combustion rate, the setting section sets a manner of adding fuel by the fuel adding device;

wherein the setting section switches the manner of adding fuel between a continuous fuel addition, in which fuel is continuously added to exhaust gas, and an intermittent fuel addition, in which fuel is intermittently added to exhaust gas; and wherein, when it is assumed that the combustion rate of particulate matter exceeds a predetermined rate, the setting section sets the manner of adding fuel to the continuous fuel addition.

15. An exhaust purifying apparatus for an internal combustion engine, comprising:

an exhaust purifying member that is located in an exhaust passage of the internal combustion engine, wherein the exhaust purifying member traps particulate matter in exhaust gas;

a fuel adding device for adding fuel to exhaust gas that passes through the exhaust purifying member;

a setting section, wherein the setting section estimates a combustion rate of particulate matter in the exhaust purifying member in a state where the fuel adding device adds fuel to the exhaust gas, and wherein, based on the estimated combustion rate, the setting section sets a manner of adding fuel by the fuel adding device;

wherein the setting section switches the manner of adding fuel between a continuous fuel addition, in which fuel is continuously added to exhaust gas, and an intermittent fuel addition, in which fuel is intermittently added to exhaust gas; and wherein, when it is assumed that the combustion rate of particulate matter is less than a predetermined rate, the setting section sets the manner of adding fuel to the intermittent fuel addition, and wherein, when it is assumed that the combustion rate of particulate matter exceeds the predetermined rate, the setting section sets the manner of adding fuel to the continuous fuel addition.

* * * * *

UNITED STATES PATENT AND TRADEMARK OFFICE
CERTIFICATE OF CORRECTION

PATENT NO. : 7,484,359 B2
APPLICATION NO. : 10/590662
DATED : February 3, 2009
INVENTOR(S) : Tatsuhisa Yokoi et al.

It is certified that error appears in the above-identified patent and that said Letters Patent is hereby corrected as shown below:

| Column | Line | |
|---|---|---|
| 9 | 33 | Change "ΔP/GA" to --ΔP/Ga--. |
| 9 | 37 | Change "GA) is increased." to --Ga) is increased.--. |
| 9 | 38 | Change "Dp×GA" to --Dp×Ga--. |
| 9 | 42 | Change "ΔP/GA" to --ΔP/Ga--. |
| 9 | 55 | Change "ΔP/GA" to --ΔP/Ga--. |
| 11 | 58 | Before "internal" insert --an--. |
| 12 | 15 | Change "An exhaust" to --The exhaust--. |
| 12 | 21 | Before "apparatus" insert --exhaust purifying--. |

Signed and Sealed this

Fifteenth Day of December, 2009

David J. Kappos
*Director of the United States Patent and Trademark Office*